(12) United States Patent
Keller et al.

(10) Patent No.: US 9,815,235 B2
(45) Date of Patent: Nov. 14, 2017

(54) CONTROLLING CROSSLINKING DENSITY AND PROCESSING PARAMETERS OF PHTHALONITRILES

(71) Applicant: The United States of America, as represented by the Secretary of the Navy, Washington, DC (US)

(72) Inventors: Teddy M. Keller, Fairfax Station, VA (US); Matthew Laskoski, Springfield, VA (US); Andrew P. Saab, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/265,958

(22) Filed: Sep. 15, 2016

(65) Prior Publication Data

US 2017/0001357 A1    Jan. 5, 2017

Related U.S. Application Data

(62) Division of application No. 14/926,429, filed on Oct. 29, 2015, now Pat. No. 9,464,170.

(60) Provisional application No. 62/091,739, filed on Dec. 15, 2014.

(51) Int. Cl.
| | | |
|---|---|---|
| *B29C 47/00* | (2006.01) | |
| *C08G 73/06* | (2006.01) | |
| *C08K 5/00* | (2006.01) | |
| *C08K 5/523* | (2006.01) | |
| *D01F 6/78* | (2006.01) | |
| *D01F 1/10* | (2006.01) | |
| *D01F 6/58* | (2006.01) | |
| *C08K 5/42* | (2006.01) | |
| *B29K 79/00* | (2006.01) | |
| *B29L 31/00* | (2006.01) | |

(52) U.S. Cl.
CPC ...... *B29C 47/0004* (2013.01); *B29C 47/0011* (2013.01); *C08G 73/0672* (2013.01); *C08K 5/0016* (2013.01); *C08K 5/42* (2013.01); *C08K 5/523* (2013.01); *D01F 1/10* (2013.01); *D01F 6/58* (2013.01); *D01F 6/78* (2013.01); *B29K 2079/00* (2013.01); *B29L 2031/731* (2013.01); *D10B 2331/14* (2013.01)

(58) Field of Classification Search
CPC ............ B29C 47/0004; B29C 47/0011; C08G 73/0672; C08F 5/0016; C08F 5/42; C08F 5/523; D01F 1/10; D01F 6/58; D01F 6/78
USPC ........................................................ 524/710
See application file for complete search history.

(56) References Cited

U.S. PATENT DOCUMENTS 5,951,908 A    9/1999  Cui et al.
8,187,423 B1   5/2012  Glenn et al.

*Primary Examiner* — Kelechi Egwim
(74) *Attorney, Agent, or Firm* — US Naval Research Laboratory; Joseph T. Grunkemeyer

(57) ABSTRACT

Disclosed is a composition having: a diphthalonitrile compound having at least two phthalonitrile groups; a reactive plasticizer; and an amine curing agent. Also disclosed is a composition having: a diphthalonitrile compound having at least two phthalonitrile groups; a nonreactive plasticizer; and an amine curing agent. Also disclosed is a method of: providing a composition having a phthalonitrile compound; heating the composition to a processing temperature until the composition has a viscosity of 30-40 Pa·s at the processing temperature to form a partially cured composition; placing the partially cured composition into a material chamber of an extrusion machine; heating the partially cured composition and the material chamber to within 10° C. of the processing temperature; and extruding fiber from the extrusion machine.

6 Claims, No Drawings

CONTROLLING CROSSLINKING DENSITY AND PROCESSING PARAMETERS OF PHTHALONITRILES

This application is a divisional application of U.S. Pat. No. 9,464,170, issued on Oct. 11, 2016, which claims the benefit of U.S. Provisional Application No. 62/091,739, filed on Dec. 15, 2014. The provisional application and all other publications and patent documents referred to throughout this nonprovisional application are incorporated herein by reference.

TECHNICAL FIELD

The present disclosure is generally related to phthalonitrile polymers.

DESCRIPTION OF RELATED ART

Phthalonitrile (PN)-based polymers exhibit superior flammability and high temperature properties, relative to other high temperature polymers. Until recently, the bisphenol-based and oligomeric aromatic phthalonitrile polymers have been cured to gelation/solid at temperatures above 200° C. The phthalonitrile technology is designed to replace polyimides for aircraft applications and vinyl esters/epoxy resins for ship applications due to their improved processability and superior physical characteristics. Phthalonitrile resins are showing outstanding potential as matrix materials for advanced composites. Until the synthesis of the oligomeric aromatic phthalonitriles, the polymerization reactions had to be carried-out at temperatures at or greater than 200° C. or at a temperature slightly greater than the melting point of the first generation aromatic phthalonitriles, which are synthesized from the salts of the bisphenol and 4-nitrophthalonitrile. The phthalonitrile monomers polymerize through the cyano groups with the aid of an appropriate curing agent to yield a crosslinked polymeric network with high thermal and oxidative stabilities. These polymers are obtained by heating the phthalonitrile monomers and a small amount of curing additive in the melt-state at or above 200° C. for extended periods of time. Moreover, a low viscosity resin enables composite processing by resin transfer molding (RTM), resin infusion molding (RIM), and other low-cost manufacturing techniques. Furthermore, a low melt viscosity and a larger processing window are useful for fabrication of thick composite sections where the melt has to impregnate thick fiber performs. The ability to form a reactive PN prepolymer intermediate will enhance the chance of the high temperature PN polymer being considered for automotive and other domestic applications needing a fast cure to a solid configuration. The high thermal stability and the ability to form a high char yield (very little gas formation) upon pyrolysis contribute to the outstanding fire performance of the phthalonitrile polymer. For instance, the fire performance of phthalonitrile-carbon and phthalonitrile-glass fiber reinforced composites are superior to that of other thermoset-based composites currently in use for aerospace, ship and submarine applications. The phthalonitriles are still the only polymeric material that meets MIL-STD-2031 for usage inside of a submarine.

Oligomeric phthalonitrile monomers, which melt above 40° C. but below 150° C., exhibit outstanding flammability properties upon polymerization for ship, submarine, aerospace, and other domestic applications and can withstand high temperatures (300-375° C.) in oxidative environments such as air. The use of low molecular weight precursor resins or low melting monophthalonitrile compounds to obtain thermosetting polymeric materials with high thermo-oxidative properties is advantageous from a processing standpoint. Liquid precursor resins such as the liquid oligomeric phthalonitriles are useful in composite fabrication by a variety of methods such as infusion, resin transfer molding, and prepreg consolidation. Furthermore, resins with a large processing window between the melting point and the cure temperature are desirable to control the viscosity and the rate of curing for fabrication of shaped fiber reinforced composite components by cost effective methods such as resin transfer molding (RTM) and resin infusion molding (RIM).

BRIEF SUMMARY

Disclosed herein is a composition comprising: a diphthalonitrile compound having at least two phthalonitrile groups; a reactive plasticizer; and an amine curing agent.

Also disclosed herein is a composition comprising: a diphthalonitrile compound having at least two phthalonitrile groups; a nonreactive plasticizer; and an amine curing agent.

Also disclosed herein is a method comprising: providing a composition comprising a phthalonitrile compound; heating the composition to a processing temperature until the composition has a viscosity of 30-40 Pa·s at the processing temperature to form a partially cured composition; placing the partially cured composition into a material chamber of an extrusion machine; heating the partially cured composition and the material chamber to within 10° C. of the processing temperature; and extruding fiber from the extrusion machine.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

This disclosure is related to modification to the polymerization of diphthalonitrile-based resin in an effort to develop flame resistant fibers/textiles from phthalonitrile (PN) resins by the addition of a plasticizer to the precursor composition mixture. The method involves the polymerization of mixtures of diphthalonitrile resin, plasticizer, and curing additive. The plasticizer can be a reactive plasticizer, including but not limited to a reactive monophthalonitrile plasticizer, which will reduce the crosslinking density, to toughen or reduce the brittleness and to control selected physical features such as mechanical properties and the glass transition temperature. In addition, the method also concerns the addition of non-reactive plasticizers such as phosphorus containing compounds or low molecular weight polyphenyl ether compounds to the precursor polymerization compositions to aid in the polymerization reaction conditions and to affect the overall physical properties of the cured polymers. The term "plasticizer" is known to one skilled in the art. Plasticizers are added to reduce viscosity and improve flow characteristics, and they typically lower glass transition temperature and lower hardness and/or stiffness. Virtually any substance that can disperse in a polymeric material or polymer resin is capable of acting as a plasticizer. The phthalonitrile/plasticizer compositions are useful for special applications where controlled flow is important such as in the spinning or extrusion of phthalonitrile-based fibers to allow for the advancement of the molecular weight. The advancement of molecular weight is a means of increasing the draw strength, flexibility, and toughness of the material under both flowing and non-flowing conditions, which may be necessary for processing methods or final applications that require tension (drawing) and/or bending of the flowing and/or non-flowing material. However, the advancement of molecular weight may excessively increase the viscosity of the flowing material at the desired processing temperature, making it difficult or impossible to adequately move this material through the process machinery. In general, the plasticizer permits a reduction of the viscosity of the material to an appropriate value for the required processing conditions.

The diphthalonitrile/reactive monophthalonitrile resin precursor composition mixtures may afford a low viscosity melt for processability into structure, fiber, and film application. Such mixtures can be utilized for composite fabrication by cost effective-method such as resin transfer molding, resin infusion molding, and filament winding. Moreover, in the case of fiber formation by protrusion techniques, the prepolymer B-staged composition, which is an intermediate in the polymerization reaction, will exist longer as the polymerization reaction occurs to higher molecular weight crucial for the formation and stability toughing of fibers or textiles from such a composition.

The nonreactive plasticizer will be added to the precursor composition mixture to improve the processability, flexibility, and durability of the phthalonitrile thermosetting polymer. In its simplest concept, high-boiling organic plasticizers are added to the precursor phthalonitrile composition to impart flexibility to the cured thermosetting polymer.

The method involves a precursor composition containing a diphthalonitrile, plasticizer(s) (reactive monophthalonitrile and/or nonreactive material), and a curing additive. The molecular weight of the diphthalonitrile resin is readily controlled by the number of repeat units in the spacer unit between the terminal phthalonitrile moieties. As the spacer unit becomes very long between the phthalonitrile units, the diphthalonitrile resin commences to exhibit thermoplastic properties with the crosslinked network greatly diminished. Moreover, the viscosity of the melted high molecular weight resin will increase with difficulty in stirring. The curing additive can be added directly to the composition or after the composition has been heated to the melt stage. Moreover, the properties of the corresponding polymer will depend on the amount of each component within the precursor composition. The reactive monophthalonitrile plasticizer acts to reduce the viscosity of the precursor composition mixture and to control the crosslink density within the networked or crosslinked PN polymer. Larger amounts of the monophthalonitrile will result in a polymeric phthalonitrile with a reduction in the crosslinking density, which could be important for some applications such as in the fabrication of tough, flexible fibers/textiles and films.

This method also involves the addition of nonreactive plasticizers to the precursor composition in various ratios to help control the initial viscosity of the melted precursor phthalonitrile/curing additive compositions and the overall mechanical properties of the cured mixture. The presence of the nonreactive plasticizer in various amount aids in the control of the overall viscosity of the polymerization melted mixture and the physical properties of the cured phthalonitrile based polymer.

The possible combinations of reactants are:
1) diphthalonitrile+reactive monophthalonitrile plasticizer+curing additive→PN polymer
2) diphthalonitrile+reactive monophthalonitrile and nonreactive plasticizer+curing additive→PN polymer
3) diphthalonitrile+nonreactive plasticizer+curing additive→PN polymer The method also involves the reaction and the isolation of the reactive PN prepolymer intermediate from reactions 1), 2), and 3) as disclosed in U.S. Pat. No. 8,921,510. The initial formation of reactive initiation intermediate from the initial reaction of the curing additive with the PN resin is the slow step in the PN polymerization reaction. Once the initial slow initiation reaction occurs, the propagation reaction commences to form the reactive PN prepolymer intermediate involving further reaction of the initiation reaction intermediate with additional phthalonitrile causing an increase in the viscosity of the reaction media and an enhancement in the molecular weight of the reactive PN prepolymer intermediate. This is the propagation step in the polymerization reaction and is highly reactive compared to the initial stage of the initiation reaction.

Low melting oligomeric phthalonitriles are cured to gelation or a shaped solid in the presence of a combination of curing additive, reactive monophthalonitrile plasticizer, and/or nonreactive plasticizer at or below 300° C. The precursor composition mixture containing the diphthalonitrile, plasticizer(s), and curing additive can be prepared under ambient conditions and stored indefinitely under ambient conditions. Alternatively, the precursor composition can be prepared at room temperature and can be heated to a reactive PN prepolymer intermediate and stored indefinitely under ambient condition below the polymerization temperature. Further heating will result in further reaction of the PN intermediate with PN resin or reactive monophthalonitrile plasticizer during the propagation step and, if heated long enough, the composition will become rubbery and ultimate gelation to a shaped solid, fiber, or film. At this point, the solid PN polymer will retain its shape and can be placed in a high temperature furnace/oven at temperatures <400° C. to fully cure to a networked polymer. However, the reaction mixture can be stopped at any point during the propagation step (reactive PN prepolymer intermediate) before gelation occurs and used as a curing PN additive or can be isolated as prepolymer PN composition for rapid conversion to a fully cured shaped solid configuration. Any phthalonitrile monomer(s) that exist in the liquid state below 250° C. can be converted to the reactive PN prepolymer intermediate. Such phthalonitriles include the simple bisphenol-based phthalonitriles of bisphenol A (bisphenol A phthalonitrile, m. p. 195-198° C.) and resorcinol (resorcinol phthalonitrile, m.p. 173-175° C.), the multiple aromatic ether oligomeric phthalonitriles, and the aromatic ether PEEK-like phthalonitriles.

The development and isolation of the precursor composition mixtures in which the diphthalonitrile resin contain a long spacer and a plasticizer (can be a nonreactive plasticizer, and/or reactive monophthalonitrile plasticizer or exist as reactive PN prepolymer intermediates) open up applications for the easy to process, flame resistant high temperature PN resins, needing an improvement in processability such as fabrication of fibers and films and a fast cure to gelation or to solid configuration. The properties and time to gelation of the precursor composition mixture or reactive PN prepolymer intermediate can be readily controlled from minutes to longer times depending on the molecular weight of the diphthalonitrile resin intermediate. The processing time to gelation of the precursor composition can also be controlled as a function of the amount of curing additive. When the precursor composition mixture is heated above 150° C., the initiation reaction initially occurs from intimate reaction to the reactive initiation intermediate; the viscosity will not have changed very much at this stage. Further reaction of the reactive initiation intermediate with additional PN resin in the presence of the plasticizer will result in the formation of the reactive PN prepolymer intermediate with a controlled viscosity. The reactive PN prepolymer intermediate can be isolated by quenching to ambient conditions and stored indefinitely without further reaction. The prepolymer intermediate can also be used as a curing additive for the precursor composition mixture or can be remelted in a shaped reaction vessel or mold and then quickly converted to a shaped polymer, fiber, or film by thermal means. In addition, the reactive PN prepolymer intermediate containing the plasticizer(s) can be used in the fabrication of composite components by cost-effective manufacturing techniques in a controlled manner from minutes to longer reaction times depending on the application and the amount of curing additive present.

Prepregs containing the new reactive PN prepolymer intermediate curing composition can be stored indefinitely under ambient condition without the need for storage under freezer conditions, which is the case with other resin systems such as epoxy curing compositions. By controlling the initial cure to the reactive PN prepolymer intermediate, industry can use existing autoclaves, shaped molds, and more recent out of the autoclave technologies such as resin transfer molding (RTM), resin infusion molding (RIM), filament winding, and potentially by automated composite manufacturing techniques such as automated tape laying and automated fiber placement, which is currently being used by the aerospace industries, in the fabrication of composite components. The development of the reactive PN prepolymer intermediate containing the plasticizers is a major discovery especially for potential usages in the textile, automotive, electronic, ship, and aerospace industries. Since the viscosity of the liquid phthalonitrile polymerization system can be easily controlled as a function of temperature, the concentration of the plasticizer, and the amount of curing additive, new applications needing the flame resistant and high temperature properties of the PN polymer such as the textile, automotive, and construction industries are possible. The ability to cure to a shaped solid below 200° C. and the superior physical properties relative to other high temperature polymers such as polyimides enhances the importance of the phthalonitrile system. Due to the low water absorptivity, processability at a temperature comparable to epoxy resins, and the superior thermo-oxidative stability of fully cured phthalonitriles to temperatures in excess of 375° C., the new reactive PN prepolymer intermediate has the potential for a variety of applications not envisioned previously.

This is the first known synthetic method to control the crosslinking density and the use of plasticizers to improve the processability of the curing phthalonitrile composition. Previously, the reactive monophthalonitriles have not been reacted with diphthalonitriles to control the network and the crosslinking density or to tailor specific physical properties such as flexibility and the overall modulus of the cured phthalonitrile polymers. The nonreactive plasticizer is embedded between the spacer and reduces the interaction of the spacer units between the phthalonitrile moieties in the networked phthalonitrile polymer. Further reaction of the plasticized PN prepolymer intermediate with additional PN resin or continued heating of the plasticized PN prepolymer intermediate to gelation will result in the formation of advanced high performance polymers processable in a timely manner and in a controlled manner. The phthalonitrile-based composition mixture, which displays superb processability, is readily polymerized through the phthalonitrile groups yielding high temperature thermosetting polymers.

The method uses a composition that comprises a diphthalonitrile compound. The diphthalonitrile compound has at least two phthalonitrile groups (3,4-dicyanophenyl or 2,3-dicyanophenyl), and may, for example, have only two such groups. Any such diphthalonitrile compound may be used, including but not limited to, those disclosed in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,259,471, U.S. Pat. No. 4,304,896, U.S. Pat. No. 4,307,035, U.S. Pat. No. 4,315,093, U.S. Pat. No. 4,351,776, U.S. Pat. No. 4,408,035, U.S. Pat. No. 4,409,382, U.S. Pat. No. 4,410,676, U.S. Pat. No. 5,003,039, U.S. Pat. No. 5,003,078, U.S. Pat. No. 5,004,801, U.S. Pat. No. 5,132,396, U.S. Pat. No. 5,159,054, U.S. Pat. No. 5,202,414, U.S. Pat. No. 5,208,318, U.S. Pat. No. 5,237,045, U.S. Pat. No. 5,242,755, U.S. Pat. No. 5,247,060, U.S. Pat. No. 5,292,854, U.S. Pat. No. 5,304,625, U.S. Pat. No. 5,350,828, U.S. Pat. No. 5,352,760, U.S. Pat. No. 5,389,441, U.S. Pat. No. 5,464,926, U.S. Pat. No. 5,925,475, U.S. Pat. No. 5,965,268, U.S. Pat. No. 6,001,926, U.S. Pat. No. 6,297,298, U.S. Pat. No. 6,756,470, U.S. Pat. No. 6,891,014, U.S. Pat. No. 7,452,959, U.S. Pat. No. 7,511,113, U.S. Pat. No. 8,039,576, U.S. Pat. No. 8,222,403, U.S. Pat. No. 8,362,239, U.S. Pat. No. 8,530,607, U.S. Pat. No. 8,735,532, U.S. Pat. No. 8,859,712, U.S. Pat. No. 8,981,036, and U.S. Pat. No. 8,921,510, all incorporated herein by reference.

The diphthalonitrile compound may contain ether groups, ketone groups, and/or sulfonyl groups and may have an aromatic backbone. Any main chain that bridges an aromatic group (other than the phthalonitrile groups) is considered to be an aromatic backbone. The diphthalonitrile compound may be a small molecule, such as resorcinol diphthalonitrile, or may be an oligomer that may be made by reacting a dihalo compound with an excess of a dihydroxy compound, followed by reaction with nitrophthalonitrile. The ratio of dihydroxy compound to dihalo compound determines the average number of repeat units in the oligomer. Thus, the diphthalonitrile compound may include a mixture of oligomers of different lengths that may be collectively referred to as "the diphthalonitrile compound". The term "oligomer" does not restrict the diphthalonitrile compound to any particular molecular weight. Any mixture of more than one different diphthalonitrile compounds may be used in the composition.

Suitable diphthalonitrile compounds include, but are not limited to, those listed in Table 1. The value n is a positive integer.

TABLE 1

| Name | Structure |
|---|---|
| bisphenol A diphthalonitrile | NC—⟨benzene with CN⟩—O—⟨benzene⟩—C(CH$_3$)(CH$_3$)—⟨benzene⟩—O—⟨benzene with CN⟩—CN |

TABLE 1-continued

| Name | Structure |
|---|---|
| resorcinol diphthalonitrile | 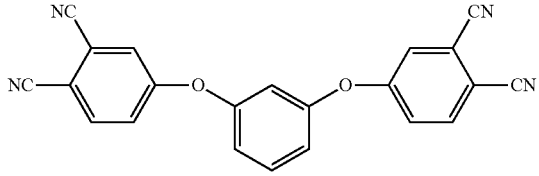 [SMILES: N#Cc1ccc(Oc2cccc(Oc3ccc(C#N)c(C#N)c3)c2)cc1C#N] |
| resorcinol/ m-dibromobenzene diphthalonitrile | 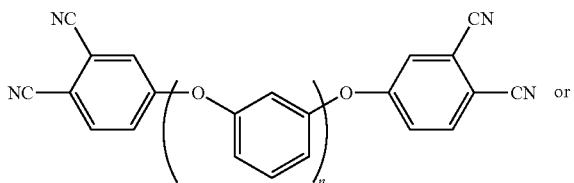 or 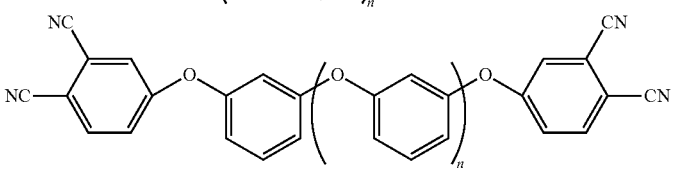 |
| biphenol diphthalonitrile | 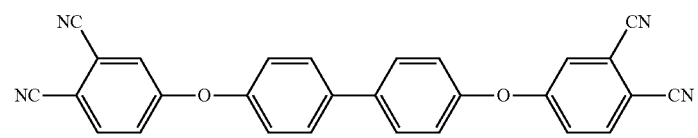 [SMILES: N#Cc1ccc(Oc2ccc(-c3ccc(Oc4ccc(C#N)c(C#N)c4)cc3)cc2)cc1C#N] |
| bisphenol A/dibromobenzophenone diphthalonitrile | 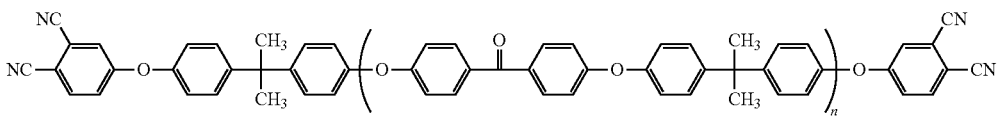 |
| bisphenol A/ dibromophenyl sulfone diphthalonitrile | 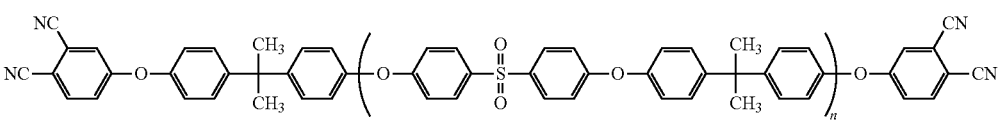 |
| bisphenol A/p-dibromobenzene diphthalonitrile | 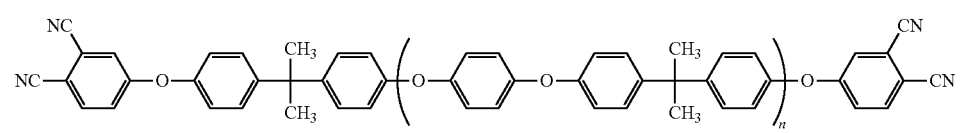 |

The composition also comprises a monophthalonitrile compound or other reactive plasticizer and/or a nonreactive plasticizer. The monophthalonitrile compound has only one phthalonitrile group and does not have two or more such groups. It may be made by reacting a monohydroxy compound with nitrophthalonitrile. Any such diphthalonitrile compound may be used, including but not limited to, those disclosed in the patents listed above, or analogues thereof having only one phthalonitrile group. An aromatic monophthalonitrile may be used to promote compatibility with an aromatic diphthalonitrile. Reactive plasticizers include any material that serves a plasticizing function, but which is also capable of reacting with the phthalonitrile resin or its phthalonitrile groups under the resin's curing conditions. Examples of reactive plasticizers include but are not limited to the phthalonitrile resins with a single reactive phthalonitrile group described above, or epoxy resins. Any mixture of more than one different monophthalonitrile compounds or reactive plasticizers may be used in the composition.

Suitable monophthalonitrile compounds include, but are not limited to, those listed in Table 2.

TABLE 2

| Name | Structure |
|---|---|
| 4-dodecyl phthalonitrile | $C_{12}H_{25}$-C$_6$H$_3$(CN)$_2$ |
| 4-(4-nonylphenoxy)phthalonitrile | $C_9H_{19}$-C$_6$H$_4$-O-C$_6$H$_3$(CN)$_2$ |
| 4-(4-dodecylphenoxy)phthalonitrile | $C_{12}H_{25}$-C$_6$H$_4$-O-C$_6$H$_3$(CN)$_2$ |
| 4-(m-cumylphenoxy)phthalonitrile | (NC)$_2$C$_6$H$_3$-O-C$_6$H$_4$-C(CH$_3$)$_2$-C$_6$H$_5$ |
| 4-(3-hydroxyphenoxy)phthalonitrile | HO-C$_6$H$_4$-O-C$_6$H$_3$(CN)$_2$ |

Plasticizers are known in the art and may be any chemical compound that may be added to a polymeric matrix in order to increase its plasticity or fluidity, or to decrease its modulus or rigidity. The nonreactive plasticizer must be able to disperse in the polymeric material either with or without dissolving. It is nonreactive toward the polymeric material. Examples of plasticizers include commercially available acid esters, trimellitates, organophosphates, and even other polymers can be used as plasticizers. Plasticizers reduce interactions between segments of polymer chains, decreasing $T_g$, melt viscosity, and elastic modulus. Plasticizers are usually selected to be nonvolatile materials and have good compatibility with the desired polymer. Plasticizers make it possible to achieve improved compound processing characteristics, while also providing flexibility in the end-use product.

Suitable nonreactive plasticizers include, but are not limited to, those listed in Table 3. Any mixture of more than one different plasticizer may be used in the composition.

TABLE 3

| Name | Structure |
|---|---|
| cresyl diphenylphosphate | (C$_6$H$_5$O)$_2$P(O)O-C$_6$H$_4$-CH$_3$ |
| dodecyl diphenylphosphate (SANTICIZER ® 2148 Plasticizer made by Ferro) | (C$_6$H$_5$O)$_2$P(O)O-C$_{12}H_{25}$ |
| tri-n-hexyl trimellitate | C$_6$H$_3$(C(O)O-C$_6$H$_{13}$)$_3$ |
| polyphenyl ether | $-(C_6H_4-O)_n-$ |

The composition includes an amine curing agent. Such curing agents are known in the art and include, but are not limited to, those disclosed in the patents listed above and those listed in Table 4.

TABLE 4

| Name | Structure |
|---|---|
| bis[4-(4-aminophenoxy)phenyl]sulfone (p-BAPS) | $H_2N-C_6H_4-O-C_6H_4-SO_2-C_6H_4-O-C_6H_4-NH_2$ |
| bis[4-(3-aminophenoxy)phenyl]sulfone (m-BAPS) | $H_2N-C_6H_4-O-C_6H_4-SO_2-C_6H_4-O-C_6H_4-NH_2$ (meta) |
| 1,4-bis(3-aminophenoxy)benzene (p-APB) | $H_2N-C_6H_4-O-C_6H_4-O-C_6H_4-NH_2$ |
| 1,3-bis(3-aminophenoxy)benzene (m-APB) | $H_2N-C_6H_4-O-C_6H_4-O-C_6H_4-NH_2$ |

When the composition is cured according to the methods described herein or in the patents listed above, the diphthalonitrile compound, amine curing agent, and any monophthalonitrile compound react to form a prepolymer or a thermoset. The presence of the amine curing agent promotes the formation of isoindoline groups, but some triazine groups and phthalocyanine groups may also form. The isoindoline reaction is shown below. Of the total such groups, the isoindoline groups may make up at least 25, 50, 75, or 90 mol % of the total groups.

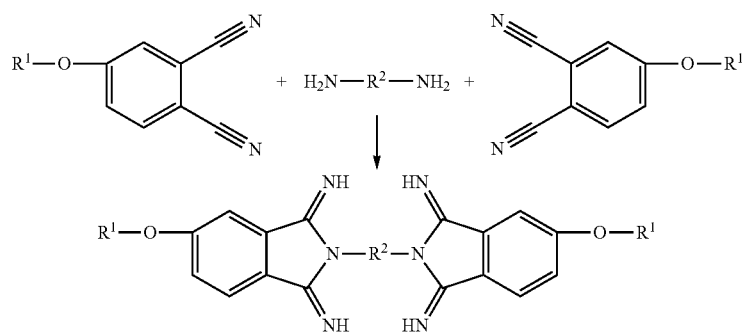

The prepolymers and thermosets described herein, as well as those made from any other phthalonitrile-containing composition such as those disclosed in the patents listed above, may be made in the form of a fiber. In one suitable way of making the fiber, the composition is first heated to a temperature of at least 150° C., such as 220-250° C., until the viscosity of the composition reaches 30-40 Pa·s at that temperature. The viscosity may be measured in a rotational rheometer using a 25 mm diameter top rotor at a gap setting of 250 microns in oscillation mode, with maximum strain of 3%. The increase in viscosity is due to partial reaction or curing of the composition.

The partially cured composition is then placed in an extruder barrel of any form of fiber extruding apparatus. If not already so, the barrel and the composition are heated to the same temperature as during the partial curing. The same temperature may mean within ±10° C. of that temperature. Extrusion of the fiber may then begin. The extrusion may be stopped when the viscosity has increased, due to further partial curing, to double the initial viscosity. Thus, the extrusion is stopped before the viscosity is 60-80 Pa·s, depending on the initial viscosity. The viscosity of the material in the barrel may be determined by reference to a previously created viscosity vs. time curve.

The following examples are given to illustrate specific applications. These specific examples are not intended to limit the scope of the disclosure in this application.

EXAMPLE 1

General Synthetic Procedure of Oligomeric Phthalonitrile Based on Bisphenol A and 4,4'-Dichlorobenzophenone in One Reaction Pot—

To a 250 mL, three-necked flask fitted with a thermometer, a Dean-Stark trap with condenser, and a nitrogen inlet were added bisphenol A, 4,4'-dichlorobenzophenone, powdered anhydrous $K_2CO_3$ (2.2 eq based on bisphenol A), toluene, and dimethylsulfoxide (DMSO). Toluene was used to control the refluxing azeotropic removal of water and to control the temperature of the reaction content. The resulting mixture was degas sed with nitrogen at ambient temperature and the Dean-Stark trap was filled with toluene. The mixture was refluxed at 165-175° C. under a nitrogen atmosphere for 6-18 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL portions of distilled water until neutral. The isolated solid was vacuum dried to yield the oligomeric phthalonitrile. The length and molecular weight of the PN is designated by the ratio of bisphenol A to 4,4'-dichlorobenzophenone, e.g. 2:1 oligomeric phthalonitrile means 2 moles bisphenol A to 1 mole 4,4'-dichlorobenzophenone.

EXAMPLE 2

Formulation of 2:1 Oligomeric Phthalonitrile Based on Bisphenol A and 4,4'-Dichlorobenzophenone with a Mono Phthalonitrile (4-Dodecyl Phthalonitrile, 30 Mol %), Ferro Phosphate Plasticizer (10 wt %), and m-BAPS (5 Mol %) Heat Treated at 225° C.—

The 2:1 oligomeric phthalonitrile from Example 1 (5.0 g), 4-dodecyl phthalonitrile (0.127 g, 30 mol %), Ferro phosphate plasticizer (0.537 g, 10 wt %) and m-BAPS (0.256 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 30 Pa·s.

EXAMPLE 3

Formulation of 2:1 Oligomeric Phthalonitrile Based on Bisphenol A and 4,4'-Dichlorobenzophenone with a Mono Phthalonitrile (4-Dodecyl Phthalonitrile, 30 Mol %) and m-BAPS (5 Mol %) Heat Treated at 225° C.—

The 2:1 oligomeric phthalonitrile from Example 1 (5.0 g), 4-dodecyl phthalonitrile (0.127 g, 30 mol %), and m-BAPS (0.256 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 30 Pa·s.

EXAMPLE 4

Formulation of 5:4 Oligomeric Phthalonitrile Based on Bisphenol A and 4,4'-Dichlorobenzophenone with a Mono Phthalonitrile (4-Dodecyl Phthalonitrile, 30 Mol %), Ferro Phosphate Plasticizer (10 wt %), and p-BAPS (15 Mol %) Heat Treated at 200° C.—

The 5:4 oligomeric phthalonitrile prepared by the procedure of Example 1 (6.0 g), 4-dodecyl phthalonitrile (0.324 g, 30 mol %), Ferro phosphate plasticizer (0.600 g, 10 wt %), and p-BAPS (0.181 g, 15 mol %) were stirred at 225° C. for 2 minutes to form a homogeneous solution. The mixture was cooled, placed in a furnace, and heated at 200° C. for various times in order to obtain a mixture with an initial viscosity at 225° C. of between 10 and 30 Pa·s.

EXAMPLE 5

Polymerization of Formulation of 5:4 Oligomeric Phthalonitrile Based on Bisphenol a and 4,4'-Dichlorobenzophenone with a Mono Phthalonitrile (4-Dodecyl Phthalonitrile, 30 Mol %), Ferro Phosphate Plasticizer (10 wt %), and p-BAPS (15 Mol %) Heat Treated to 375° C.—

The formulation (1.5 g) prepared by the procedure of Example 4 was placed in an Al planchet and cured to a solid thermoset by heating at 250° C. for 1 hr, at 300° C. for 2 hr, and at 375° C. for 2 hr. Gelation occurred to a solid thermoset during the 250° C. thermal treatment.

EXAMPLE 6

Formulation of 8:7 Oligomeric Phthalonitrile Based on Bisphenol A and 4,4'-Dichlorobenzophenone with a Mono Phthalonitrile (4-Dodecyl Phthalonitrile; 30 Mol %), Ferro Phosphate Plasticizer (10 wt %), and p-BAPS (25 Mol %) Heat Treated at 200° C.—

The 8:7 oligomeric phthalonitrile prepared by the procedure of Example 1 (8.0 g), 4-dodecyl phthalonitrile (0.278 g, 30 mol %), Ferro phosphate plasticizer (0.800 g, 10 wt %), and p-BAPS (0.258 g, 25 mol %) were stirred at 225° C. for 2 minutes to form a homogeneous solution. The mixture was cooled, placed in a furnace, and heated at 200° C. for various times in order to obtain a mixture with an initial viscosity at 225° C. between 10 and 30 Pa·s.

EXAMPLE 7

Formulation of 8:7 Oligomeric Phthalonitrile Based on Bisphenol A and 4,4'-Dichlorobenzophenone with a Mono Phthalonitrile (4-Dodecyl Phthalonitrile; 30 Mol %), Ferro Phosphate Plasticizer (10 wt %), and p-BAPS (30 Mol %) Heat Treated at 200° C.—

The 8:7 oligomeric phthalonitrile prepared by the procedure of Example 1 (10.6 g), 4-dodecyl phthalonitrile (0.376 g, 30 mol %), Ferro phosphate plasticizer (1.06 g, 10 wt %), and p-BAPS (0.410 g, 30 mol %) were stirred at 225° C. for 2 minutes to form a homogeneous solution. The mixture was cooled, placed in a furnace, and heated at 225° C. for various times in order to obtain a mixture with an initial viscosity at 225° C. of between 10 and 30 Pa·s.

EXAMPLE 8

Formulation of 8:7 Oligomeric Phthalonitrile Based on Bisphenol A and 4,4'-Dichlorobenzophenone with a Mono Phthalonitrile (4-Dodecyl Phthalonitrile; 30 Mol %), Ferro Phosphate Plasticizer (10 wt %), and p-BAPS (15 Mol %) Heat Treated at 200° C.—

The 8:7 oligomeric phthalonitrile prepared by the procedure of Example 1 (8.0 g), 4-dodecyl phthalonitrile (0.278 g, 30 mol %), Ferro phosphate plasticizer (0.800 g, 10 wt %), and p-BAPS (0.155 g, 15 mol %) were stirred at 225° C. for 2 minutes to form a homogeneous solution. The mixture was cooled, placed in a furnace, and heated at 200° C. for various times in order to obtain a mixture with an initial viscosity at 225° C. between 10 and 30 Pa·s.

EXAMPLE 9

Formulation of 11:10 Oligomeric Phthalonitrile Based on Bisphenol A and 4,4'-Dichlorobenzophenone with a Mono Phthalonitrile (4-Dodecyl Phthalonitrile; 30 Mol %), Ferro Phosphate Plasticizer (10 wt %), and p-BAPS (10 Mol %) Heat Treated at 200° C.—

The 11:10 oligomeric phthalonitrile prepared by the procedure of Example 1 (12.0 g), 4-dodecyl phthalonitrile (0.306 g, 30 mol %), Ferro phosphate plasticizer (1.2 g, 10 wt %), and p-BAPS (0.113 g, 10 mol %) were stirred at 225° C. for 2 minutes to form a homogeneous solution. The mixture was cooled, placed in a furnace, and heated at 200° C. for various times in order to obtain a mixture with an initial viscosity at 225° C. between 10 and 50 Pa·s.

EXAMPLE 10

Formulation of 21:20 Oligomeric Phthalonitrile Based on Bisphenol A and 4,4'-Dichlorobenzophenone with Trioctyl Trimellitate Plasticizer (20 wt %) and m-BAPS (50 Mol %) Heat Treated at 250° C.—

The 21:20 oligomeric phthalonitrile prepared by the procedure of Example 1 (12.0 g), trioctyl trimellitate plasticizer (2.4 g, 20 wt %), and m-BAPS (0.300 g, 50 mol %) were stirred at 250° C. for 5 minutes to form a homogeneous solution. The mixture was cooled, placed in a furnace, and heated at 250° C. for various times in order to obtain a mixture with an initial viscosity at 225° C. between 10 and 50 Pa·s.

EXAMPLE 11

Formulation of 11:10 Oligomeric Phthalonitrile Based on Bisphenol A and 4,4'-Dichlorobenzophenone with Trioctyl Trimellitate Plasticizer (20 wt %) and m-BAPS (5 Mol %) Heat Treated at 250° C.—

The 11:10 oligomeric phthalonitrile prepared by the procedure of Example 1 (12.0 g), trioctyl trimellitate plasticizer (2.4 g, 20 wt %), and m-BAPS (0.113 g, 5 mol %) were stirred at 250° C. for 5 minutes to form a homogeneous solution. The mixture was cooled, placed in a furnace, and heated at 250° C. for various times in order to obtain a mixture with an initial viscosity at 225° C. between 10 and 50 Pa·s.

EXAMPLE 12

Polymerization of Formulation of 11:10 Oligomeric Phthalonitrile Based on Bisphenol a and 4,4'-Dichlorobenzophenone with Trioctyl Trimellitate Plasticizer (20 wt %) and m-BAPS (5 Mol %) Heat Treated to 300° C.—

The formulation (1.3 g) prepared by the procedure of Example 11 was heated at 250° C. for 2 hr, at 300° C. for 2 hr, and at 400° C. for 2 hr. Gelation occurred to a solid thermoset during the 250° C. thermal treatment.

EXAMPLE 13

Preparation of Phthalonitrile Resin for General Melt Extrusion into Fiber—

Approximately 1 g of phthalonitrile composition prepared as in Example 10 is powdered and tested for viscosity in a rotational rheometer using a 25 mm diameter top rotor with a gap setting of 250 microns, at a single temperature in the range of 220 to 250° C. as desired. The measurement is in oscillation mode, with maximum strain of 3%. The resulting curve of viscosity vs. time is used to determine the time needed to cure the material to a measured viscosity of 30 to 40 Pa·s. The required amount of material prepared as in Example 10 is then heated in a convection oven at the same temperature as the viscosity measurement to a time equivalent to that determined from the viscosity curve, plus an additional amount of time that must be determined empirically to account for oven and sample heating uniformity and heat-up time. A second check of the viscosity of the partially cured material is then performed to insure a resulting value of 30 to 40 Pa·s.

EXAMPLE 14

General Process for Melt Extrusion of Phthalonitrile Resin into Fiber Using a Piston Type Extruder or a Capillary Rheometer—

Partially cured material prepared as in Example 13 in an amount appropriate for the capacity of the extruder barrel is ground to a coarse powder. The barrel must be preheated to the extrusion temperature, which is generally the temperature at which viscosity is measured from Example 13. The piston should also be heated to the same temperature. The amount of material to be extruded should be chosen not only based on the capacity of the extruder, but also on the residence time of material in the barrel for a given piston rate. Typically, the amount of time necessary for the material to advance to a viscosity value that is twice its starting value should be taken as the upper limit of the residence time. This time is directly given by the viscosity data obtained in Example 13. The material is then added to the barrel, and is allowed to thermally equilibrate for a few minutes. This time depends on the size of the extruder, and must be empirically determined. The material is then extruded at the desired rate. Mechanical drawing and winding of the resulting fiber can take place at least up to 100 m/min when using a 250 micron orifice. Fiber thickness is determined by the relative rates of both extrusion and draw winding. Following extrusion the barrel should be purged with an inert thermoplastic such as polypropylene, or otherwise cleaned, unless a second charge is to be immediately added.

EXAMPLE 15

General Process for Melt Extrusion of Phthalonitrile Resin into Fiber Using a Screw Driven Extruder with or without a Melt Pump—

Partially cured material prepared as in Example 13 in an amount appropriate for the capacity of the extruder is ground to coarse powder. The extruder must be preheated to the extrusion temperature, which is generally the temperature at which viscosity is measured from Example 13. The amount of material to be extruded should be chosen not only based on the capacity of the extruder, but also on the residence time of material in the extruder chamber for a given feed rate. Typically, the amount of time necessary for the material to advance to a viscosity value that is twice its starting value should be taken as the upper limit of the residence time. This time is directly given by the viscosity data obtained in example 13. The material is then added to the extruder feed and is allowed to thermally equilibrate for several minutes. This process is greatly aided by the drive action of the extruder, which melts and equilibrates the material quickly. The material is then extruded at the desired rate. Mechanical winding of the resulting fiber can take place at least up to 100 m/min for an individual fiber when using a 250 micron orifice, or 200 m/min when the material is extruded as a multifilament fiber tow. Following extrusion the extruder should be purged with an inert thermoplastic such as polypropylene, or otherwise cleaned, unless a second charge is to be immediately added.

EXAMPLE 16

Formulation of 5:4 Oligomeric Phthalonitrile Based on Bisphenol A and 4,4'-Dichlorobenzophenone with Trioctyl Trimellitate Plasticizer (15 wt %) and m-BAPS (5 Mol %) Heat Treated at 250° C.—

The 5:4 oligomeric phthalonitrile prepared by the procedure of Example 1 (10.0 g), trioctyl trimellitate plasticizer (1.5 g, 15 wt %), and m-BAPS (0.100 g, 5 mol %) were stirred at 250° C. for 5 minutes to form a homogeneous solution. The mixture was cooled, placed in a furnace, and heated at 250° C. for various times in order to obtain a mixture with an initial viscosity at 225° C. between 10 and 50 Pa·s.

EXAMPLE 17

Polymerization of Formulation of 5:4 Oligomeric Phthalonitrile Based on Bisphenol a and 4,4'-Dichlorobenzophenone with Trioctyl Trimellitate Plasticizer (15 wt %) and m-BAPS (5 Mol %) Heat Treated at 400° C.—

The formulation (1.6 g) prepared by the procedure of Example 16 was heated at 250° C. for 2 hr, at 300° C. for 2 hr, and at 400° C. for 2 hr. Gelation occurred to a solid thermoset during the 250° C. thermal treatment.

EXAMPLE 18

Formulation of 26:25 Oligomeric Phthalonitrile Based on Bisphenol A and 4,4'-Dichlorobenzophenone with Trioctyl Trimellitate Plasticizer (20 wt %) and m-BAPS (75 Mol %) Heat Treated at 225° C.—

The 26:25 oligomeric phthalonitrile prepared by the procedure of Example 1 (12.0 g), trioctyl trimellitate plasticizer (2.4 g, 20 wt %), and m-BAPS (0.300 g, 75 mol %) were stirred at 250° C. for 5 minutes to form a homogeneous solution. The mixture was cooled, placed in a furnace, and heated at 225° C. for various times in order to obtain a mixture with an initial viscosity at 225° C. between 10 and 50 Pa·s.

EXAMPLE 19

Formulation of 26:25 Oligomeric Phthalonitrile Based on Bisphenol A and 4,4'-Dichlorobenzophenone with Trioctyl Trimellitate Plasticizer (30 wt %) and m-BAPS (75 Mol %) Heat Treated at 240° C.—

The 26:25 oligomeric phthalonitrile prepared by the procedure of Example 1 (12.0 g), trioctyl trimellitate plasticizer (3.6 g, 30 wt %), and m-BAPS (0.300 g, 75 mol %) were stirred at 250° C. for 5 minutes to form a homogeneous solution. The mixture was cooled, placed in a furnace, and heated at 240° C. for various times in order to obtain a mixture with an initial viscosity at 225° C. between 10 and 50 Pa·s.

EXAMPLE 20

General Synthesis of Oligomeric Phthalonitrile Based on Bisphenol A and 1,4-Dibromobenzene in One Reaction Pot—

To a 250 mL, three-necked flask fitted with a thermometer, a Dean-Stark trap with condenser, and a nitrogen inlet were added bisphenol A, 1,4-dibromobenzene, powdered anhydrous $K_2CO_3$ (1.2 eq based on bisphenol A), $(PPH_3)_3$ CuBr, toluene, and dimethylsulfoxide (DMSO). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 160-170° C. under a nitrogen atmosphere for 6-18 hr or until no more water was observed being collected in the Dean-Stark trap. The toluene was then slowly distilled off causing the temperature to rise in the reaction vessel to enhance the yield of the intermediate hydroxyl dipotassium salt and high conversion, in general, to the intermediate. The mixture was cooled to 50° C. At this time, 4-nitrophthalonitrile was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL portions of distilled water until neutral. The isolated solid was vacuum dried to yield the oligomeric phthalonitrile. The length of the PN will be designated by the ratio of bisphenol A to 1,4-dibromobenzene, e.g. 2:1 oligomeric phthalonitrile means 2 moles bisphenol A to 1 mole 1,4-dibromobenzene.

EXAMPLE 21

Formulation of 11:10 Oligomeric Phthalonitrile Based on Bisphenol A and 1,4-Dibromobenzene with a Mono Phthalonitrile (4-Dodecyl Phthalonitrile; 30 Mol %), Ferro Phosphate Plasticizer (10 wt %), and m-BAPS (5 Mol %) Heat Treated at 225° C.—

The 11:10 oligomeric phthalonitrile prepared by the procedure of Example 20 (11.0 g), 4-dodecyl phthalonitrile (0.368 g, 30 mol %), Ferro phosphate plasticizer (1.10 g, 10 wt %), and m-BAPS (0.068 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 30 Pa·s.

EXAMPLE 22

Polymerization of Formulation of 11:10 Oligomeric Phthalonitrile Based on Bisphenol a and 1,4-Dibromobenzene with a Mono Phthalonitrile (4-Dodecyl Phthalonitrile; 30 Mol %), Ferro Phosphate Plasticizer (10 wt %), and m-BAPS (5 Mol %) Heat Treated at 375° C.—

The formulation (2.0 g) prepared by the procedure of Example 21 was heated at 250° C. for 2 hr, at 300° C. for 3 hr, at 350° C. for 2 hr, and finally at 400° C. for 3 hr. Gelation to a solid thermoset occurred during the 250° C. thermal treatment.

EXAMPLE 23

Formulation of 41:40 Oligomeric Phthalonitrile Based on Bisphenol A and 1,4-Dibromobenzene with a Mono Phthalonitrile (4-Dodecyl Phthalonitrile; 30 Mol %), Ferro Phosphate Plasticizer (10 wt %), and m-BAPS (50 Mol %) Heat Treated at 250° C.—

The 41:40 oligomeric phthalonitrile prepared by the procedure of Example 20 (12.0 g), 4-dodecyl phthalonitrile (0.111 g, 30 mol %), Ferro phosphate plasticizer (1.20 g, 10 wt %), and m-BAPS (0.206 g, 50 mol %) were stirred at 200° C. for 2 minutes to form a homogeneous solution. The mixture was cooled, placed in a furnace, and heated at 250° C. for various times in order to obtain a mixture with an initial viscosity at 225° C. between 10 and 30 Pa·s.

EXAMPLE 24

Formulation of 11:10 Oligomeric Phthalonitrile Based on Bisphenol A and 1,4-Dibromobenzene with a Ferro Phosphate Plasticizer (10 wt %) and m-BAPS (5 Mol %) Heat Treated at 225° C.—

The 11:10 oligomeric phthalonitrile prepared by the procedure of Example 20 (12.0 g), Ferro phosphate plasticizer (1.20 g, 10 wt %), and m-BAPS (0.074 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 30 Pa·s.

EXAMPLE 25

Polymerization of Formulation of 11:10 Oligomeric Phthalonitrile Based on Bisphenol a and 1,4-Dibromobenzene with a Ferro Phosphate Plasticizer (10 wt %) and m-BAPS (5 Mol %) Heat Treated at 225° C.—

The formulation (1.5 g) prepared by the procedure of Example 24 was heated at 250° C. for 2 hr, at 300° C. for 2 hr, at 350° C., and finally at 400° C. for 2 hr. Gelation to a solid thermoset occurred during the 250° C. thermal treatment.

EXAMPLE 26

Formulation of 21:20 Oligomeric Phthalonitrile Based on Bisphenol A and 1,4-Dibromobenzene with a Mono Phthalonitrile (4-Dodecyl Phthalonitrile; 30 Mol %), Ferro Phosphate Plasticizer (10 wt %), and m-BAPS (40 Mol %) Heat Treated at 250° C.—

The 21:20 oligomeric phthalonitrile prepared by the procedure of Example 20 (12.0 g), 4-dodecyl phthalonitrile (0.215 g, 30 mol %), Ferro phosphate plasticizer (1.20 g, 10 wt %), and m-BAPS (0.318 g, 40 mol %) were stirred at 200° C. for 2 minutes to form a homogeneous solution. The mixture was cooled, placed in a furnace and heated at 250° C. for various times in order to obtain a mixture with an initial viscosity at 225° C. between 10 and 50 Pa·s.

EXAMPLE 27

Formulation of 2:1 Oligomeric Phthalonitrile Based on Bisphenol A and 1,4-Dibromobenzene with a Mono Phthalonitrile (4-Dodecyl Phthalonitrile; 30 Mol %), Ferro Phosphate Plasticizer (10 wt %), and m-BAPS (5 Mol %) Heat Treated at 225° C.—

The 2:1 oligomeric phthalonitrile from prepared by the procedure of Example 20 (12.0 g), 4-dodecyl phthalonitrile (1.79 g, 30 mol %), Ferro phosphate plasticizer (1.20 g, 10 wt %), and m-BAPS (0.331 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 30 Pa·s.

EXAMPLE 28

Formulation of 2:1 Oligomeric Phthalonitrile Based on Bisphenol A and 1,4-Dibromobenzene with a Ferro Phosphate Plasticizer (10 wt %) and m-BAPS (5 Mol %) Heat Treated at 250° C.—

The 2:1 oligomeric phthalonitrile prepared by the procedure of Example 20 (12.0 g), Ferro phosphate plasticizer (1.20 g, 10 wt %), and m-BAPS (0.331 g, 5 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 50 Pa·s.

EXAMPLE 29

Polymerization of Formulation of 2:1 Oligomeric Phthalonitrile Based on Bisphenol A and 1,4-Dibromobenzene with a Ferro Phosphate Plasticizer (10 wt %) and m-BAPS (5 Mol %) Heat Treated at 250° C.—

The formulation (1.6 g) prepared by the procedure of Example 28 was heated at 250° C. for 2 hr, at 300° C. for 2 hr, at 350° C., and finally at 400° C. for 2 hr. Gelation to a solid thermoset occurred during the 250° C. thermal treatment.

EXAMPLE 30

Formulation of 21:20 Oligomeric Phthalonitrile Based on Bisphenol A and 1,4-Dibromobenzene with a Mono Phthalonitrile (4-Dodecyl Phthalonitrile; 30 Mol %), Trioctyl Trimellitate (10 wt %), and m-BAPS (40 Mol %) Heat Treated at 225° C.—

The 21:20 oligomeric phthalonitrile prepared by the procedure of Example 20 (12.0 g), 4-dodecyl phthalonitrile (0.215 g, 30 mol %), trioctyl trimellitate (1.20 g, 10 wt %), and m-BAPS (0.318 g, 40 mol %) were stirred at 200° C. for 2 minutes to form a homogeneous solution. The mixture was cooled, placed in a furnace, and heated at 225° C. for various times in order to obtain a mixture with an initial viscosity at 225° C. between 10 and 50 Pa·s.

EXAMPLE 31

Polymerization of Formulation of 21:20 Oligomeric Phthalonitrile Based on Bisphenol A and 1,4-Dibromobenzene with a Mono Phthalonitrile (4-Dodecyl Phthalonitrile; 30 Mol %), Trioctyl Trimellitate (10 wt %), and m-BAPS (40 Mol %) Heat Treated at 225° C.—

The formulation (1.7 g) prepared by the procedure of Example 30 was heated at 250° C. for 2 hr, at 300° C. for 2 hr, at 350° C., and finally at 400° C. for 2 hr. Gelation to a solid thermoset occurred during the 250° C. thermal treatment.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing a composition comprising a phthalonitrile compound;
   heating the composition to a processing temperature that causes the composition to have a viscosity of 30-40 Pa·s at the processing temperature to form a partially cured composition;
   placing the partially cured composition into a material chamber of an extrusion machine;
   heating the partially cured composition and the material chamber to within 10° C. of the processing temperature; and
   extruding fiber from the extrusion machine.

2. The method of claim 1, wherein the processing temperature is from 220 to 250° C.

3. The method of claim 1, wherein the composition comprises:
- a diphthalonitrile compound having at least two phthalonitrile groups;
- a reactive plasticizer; and
- an amine curing agent.

4. The method of claim 3, wherein the composition further comprises:
- a nonreactive plasticizer.

5. The method of claim 1, wherein the composition comprises:
- a diphthalonitrile compound having at least two phthalonitrile groups;
- a nonreactive plasticizer; and
- an amine curing agent.

6. The fiber made by the method of claim 1.

* * * * *